United States Patent
Flickinger et al.

(10) Patent No.: US 10,694,677 B2
(45) Date of Patent: Jun. 30, 2020

(54) ROTOR CAGE TO TRANSITION CONE INTERFACE FOR AGRICULTURAL HARVESTER

(71) Applicant: CNH Industrial America LLC, New Holland, PA (US)

(72) Inventors: Wayne Flickinger, Oxford, PA (US); Benjamin Kemmerer, New Holland, PA (US)

(73) Assignee: CNH Industrial America LLC, New Holland, PA (US)

( * ) Notice: Subject to any disclaimer, the term of this patent is extended or adjusted under 35 U.S.C. 154(b) by 283 days.

(21) Appl. No.: 15/806,573

(22) Filed: Nov. 8, 2017

(65) Prior Publication Data

US 2019/0133041 A1 May 9, 2019

(51) Int. Cl.
  *A01F 7/06* (2006.01)
  *A01F 12/46* (2006.01)

(52) U.S. Cl.
  CPC .............. *A01F 7/062* (2013.01); *A01F 7/067* (2013.01); *A01F 12/46* (2013.01)

(58) Field of Classification Search
  USPC .................................................... 460/67, 70
  See application file for complete search history.

(56) References Cited

U.S. PATENT DOCUMENTS

| | | | |
|---|---|---|---|
| 2,493,105 A * | 1/1950 | Bunting | A01F 7/00 460/70 |
| 3,464,419 A * | 9/1969 | De Pauw | A01F 7/06 460/68 |
| 3,626,472 A * | 12/1971 | Rowland-Hill | A01F 7/06 460/70 |
| 3,943,939 A | 3/1976 | Rowland-Hill | |
| 4,087,953 A | 5/1978 | Wilson et al. | |
| 4,159,023 A | 6/1979 | Todd et al. | |
| 4,209,024 A | 6/1980 | Powell et al. | |
| 4,269,200 A * | 5/1981 | Gorsler | A01F 12/10 460/68 |
| 4,291,709 A | 9/1981 | Weber et al. | |
| 4,665,929 A | 5/1987 | Helm | |

(Continued)

FOREIGN PATENT DOCUMENTS

| | | |
|---|---|---|
| EP | 3117698 A | 1/2017 |
| WO | 2015/075516 A1 | 5/2015 |

OTHER PUBLICATIONS

International Search Report and Written Opinion for PCT/US2018/059898, dated Feb. 26, 2019 (10 pages).

*Primary Examiner* — Thomas B Will
*Assistant Examiner* — Mai T Nguyen
(74) *Attorney, Agent, or Firm* — Peter Zacharias; Patrick Sheldrake (57) ABSTRACT

A threshing system of an agricultural harvester includes a rotor cage surrounding a rotor, a threshing space defined between the rotor cage and the rotor, and a transition cone defining an infeed to the rotor cage and the threshing system. A mating interface between the rotor cage and the transition cone is curved in three different dimensions of a Cartesian coordinate system for maximizing the threshing space. As viewed from above the mating interface of the threshing system, a convex portion of the rotor cage is mounted to a concave portion of the transition cone.

18 Claims, 7 Drawing Sheets

(56) References Cited

U.S. PATENT DOCUMENTS

| | | | | |
|---|---|---|---|---|
| 4,900,290 | A | * | 2/1990 | Tanis ..................... A01F 12/10 |
| | | | | 209/263 |
| 5,145,462 | A | * | 9/1992 | Tanis ..................... A01F 12/10 |
| | | | | 460/68 |
| 5,257,959 | A | * | 11/1993 | Tanis ..................... A01F 12/10 |
| | | | | 460/67 |
| 5,344,367 | A | | 9/1994 | Gerber |
| 6,050,894 | A | | 4/2000 | Johnson |
| 8,109,815 | B2 | * | 2/2012 | Hollatz ................. A01F 12/10 |
| | | | | 460/16 |
| 8,118,652 | B2 | | 2/2012 | Hollatz |
| 2009/0143123 | A1 | | 6/2009 | Pope et al. |
| 2017/0105350 | A1 | | 4/2017 | Ricketts et al. |
| 2018/0359928 | A1 | * | 12/2018 | Flickinger ............... A01F 12/46 |

* cited by examiner

FIG. 7

ROTOR CAGE TO TRANSITION CONE INTERFACE FOR AGRICULTURAL HARVESTER

FIELD OF THE INVENTION

The present invention relates to an interface between a rotor cage and a transition cone for a combine harvester.

BACKGROUND OF THE INVENTION

As is described in U.S. Patent Application No. 2017/0105350 to CNH America LLC, which is incorporated by reference in its entirety and for all purposes, a rotary threshing or separating system of an agricultural combine harvester includes one or more rotors which can extend axially (front to rear) or transversely (side to side) within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to the cleaning system. Alternatively, the grain and finer non-grain crop material may also fall directly onto the cleaning system itself.

In combines having a rotor operating within a concave formed as a rotor cage, it is known to provide a transition cone between a feeder housing and the rotor cage. The transition cone narrows along its length, from the upstream end to the downstream end of the cone. An auger flight operated by the rotor transports the cut crop material through the transition cone, from the feeder housing and to the rotor cage. It is known to provide helical vanes on the inside surface of the transition cone, to facilitate efficient transport of crop material through the transition cone. During use, the crop material tends to follow along the transition cone vane and is somewhat compressed against the inside surface of the narrowing cone.

Figure 1:
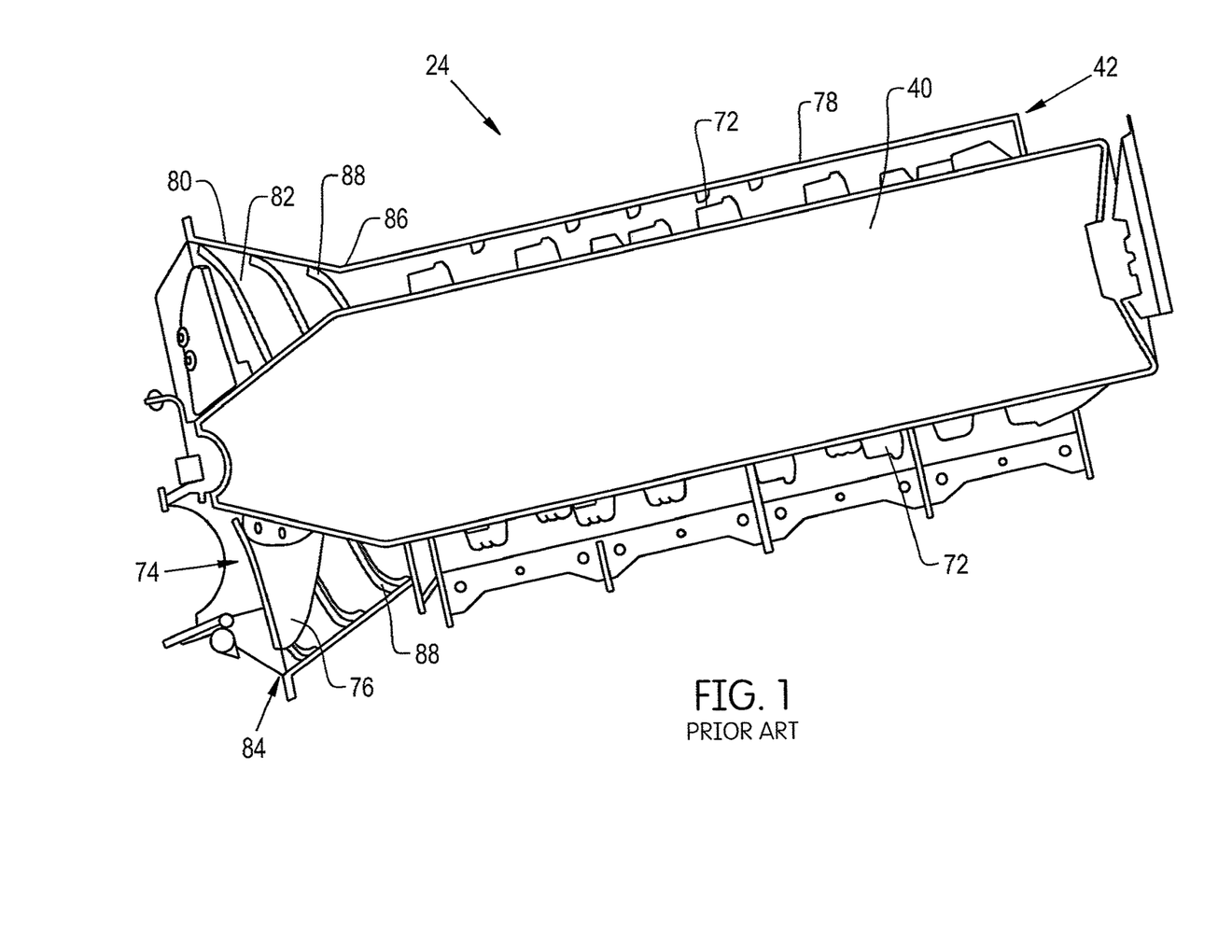
FIG. 1 is a cross-sectional view of a conventional threshing and separating system in a harvester.

Referring now to the drawings, and more particularly to FIG. 1, there is shown a conventional threshing and separating system 24. The threshing and separating system 24 generally includes a rotor 40 at least partially enclosed by and rotatable within a corresponding perforated semi-cylindrical rotor cage 42. The cut crops are threshed and separated by the rotation of rotor 40 within rotor cage 42, and larger elements, such as stalks, leaves and the like are discharged from the rear of combine 10. Smaller elements of crop material including grain and non-grain crop material, including particles lighter than grain, such as chaff, dust and straw, are discharged through perforations of rotor cage 42. Rotor 40 is shown in a representative sense in that rotor 40 may be more than one rotor 40 and may be oriented generally in line with the direction of travel of combine 10. Grain that has been separated by threshing and separating assembly 24 falls onto a grain pan and is conveyed toward cleaning system.

Rotor 40 includes a downstream portion having threshing elements 72, and an upstream portion defining an inlet auger 74 having an auger flight or flights 76. The cylindrically shaped rotor cage 42 includes a concave or concaves 78 operating together with threshing elements 72 of rotor 40 to separate grain from crop material. A transition cone 80 is connected to rotor cage 42 and defines an infeed to the threshing zone of rotor 40 and rotor cage 42. Transition cone 80 has a hollow conical shape including an inner cone surface 82 having a larger diameter at the upstream end 84 thereof and tapering to a smaller diameter at the downstream edge 86 thereof, thereby defining a decreasing inner circumference about the inner surface from upstream end 84 to downstream end 86. At least one and typically a plurality of helical or spiral vanes 88 is provided on the inner surface of transition cone 80. Inlet auger 74 operates within transition cone 80, and crop material is transferred through transition cone 80 under the force applied by rotating auger flight 76, the directional guidance provided by vanes 88 and the influence supplied by the tapering conical shape of transition cone 80.

In operation, the inlet of the rotor cage 42 experiences high wear due to the tight radial clearance between the rotor cage 42 and the rotor 40. What is desired in the art is greater clearance between the rotor 40 and the rotor cage 42 to allow for expansion of the crop material in that region, which would permit the grain to migrate to the outside of the crop material for better separation. Simply enlarging the rotor cage is not necessarily possible in all harvesters due to vertical clearance limitations within the harvester.

SUMMARY OF THE INVENTION

The present invention provides a modified rotor cage having greater clearance between the rotor and the rotor cage, and a modified transition cone for mounting to the modified rotor cage.

More particularly, according to one aspect of the invention, a threshing system of an agricultural harvester comprises a rotor cage surrounding a rotor, a threshing space defined between the rotor cage and the rotor, and a transition cone defining an infeed to said rotor cage and said threshing system, the transition cone mounted to said rotor cage at a location upstream of the rotor cage, as viewed in a direction of crop flow through the threshing system, wherein a mating interface between the rotor cage and the transition cone is curved in three different dimensions of a Cartesian coordinate system for maximizing the threshing space.

According to another aspect of the invention, as viewed from above the mating interface of the threshing system, a convex portion of the rotor cage is mounted to a concave portion of the transition cone.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

The terms "grain", "straw" and "tailings" are used principally throughout this specification for convenience but it is to be understood that these terms are not intended to be limiting. "Grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 2:
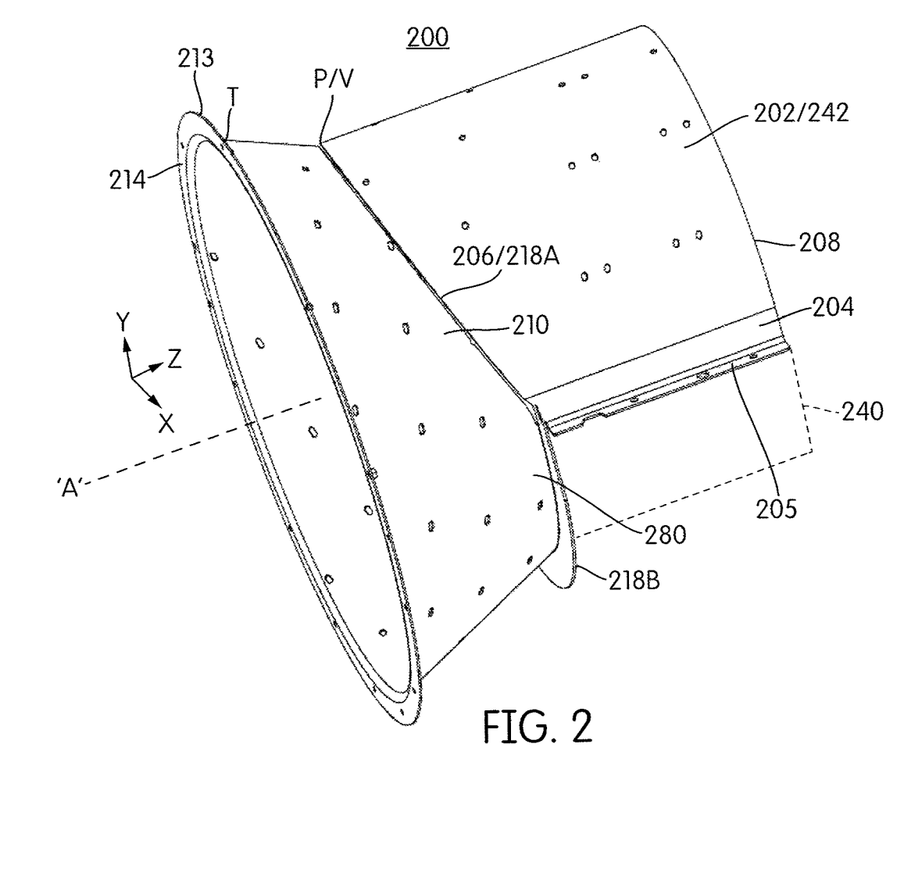
FIG. 2 is an isometric view of a partial threshing and separating system (hereinafter "system") in accordance with an exemplary embodiment of the present invention.
Figure 3:
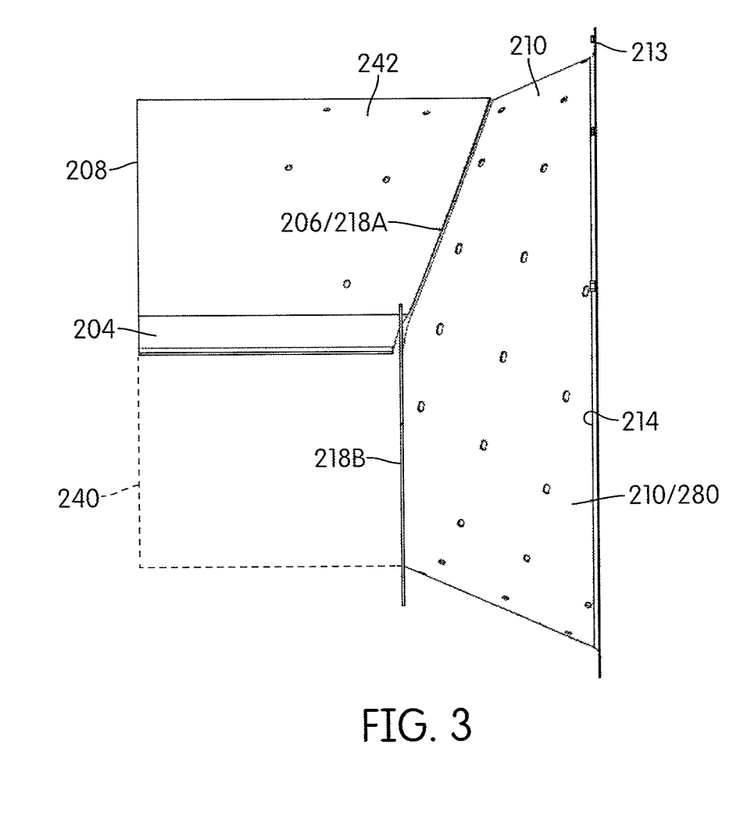
FIG. 3 is a side elevation view of the system of FIG. 2.
Figure 4:
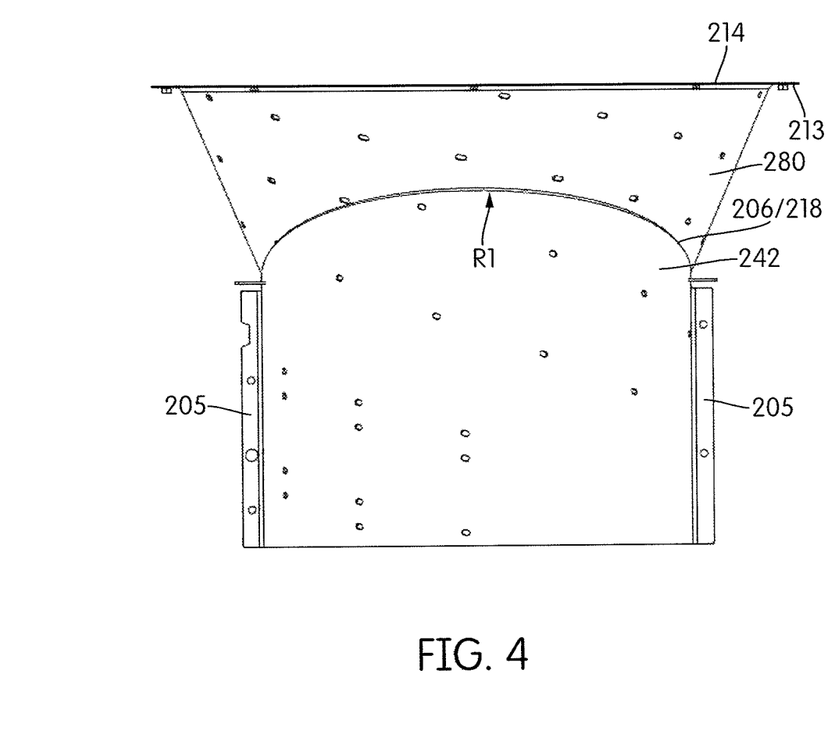
FIG. 4 is a top plan view of the system of FIG. 2.

FIGS. 2-4 depict a threshing and separating system 200 according to the present invention. System 200 is similar to system 24 of FIG. 1, and the primary differences between those systems will be described hereinafter.

System 200 includes a rotor 240 (shown schematically) at least partially enclosed by and rotatable within a corresponding perforated semi-cylindrical rotor cage 242. Transition cone 280 (hereinafter "cone") is connected to rotor cage 242 (hereinafter "cage") at a mating interface 206/218. Cone 280 defines an infeed to the threshing zone of the rotor 240 and cage 242.

Figure 6:
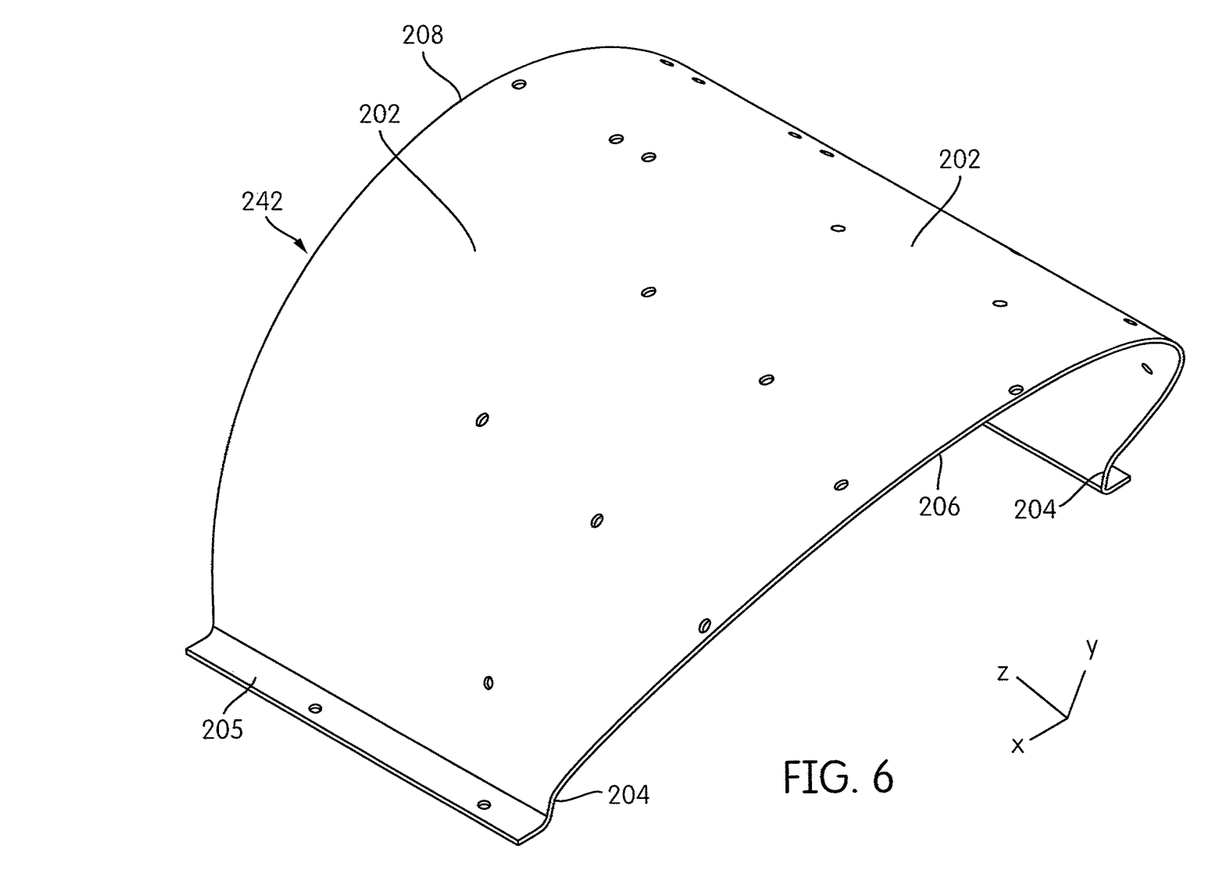
FIG. 6 is an isometric view of the rotor cage of FIGS. 2-4.
Figure 7:
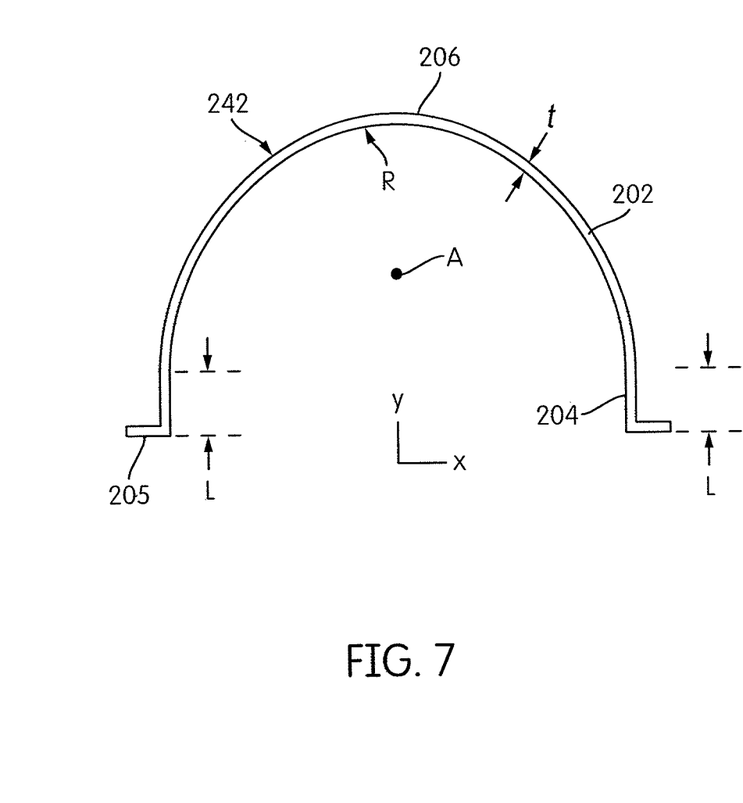
FIG. 7 is a front elevation view of the rotor cage of FIG. 6.
Figure 8:
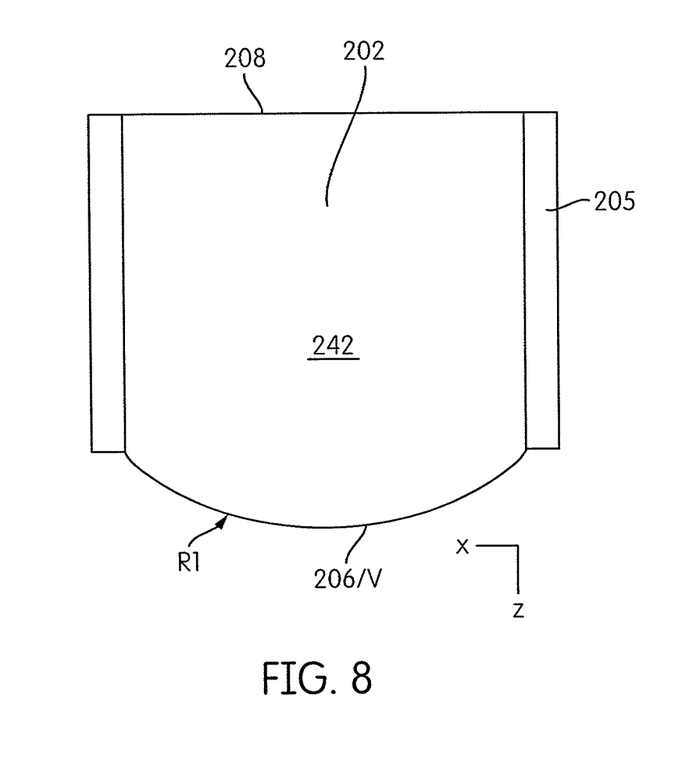
FIG. 8 is a top plan view of the rotor cage of FIG. 6.

FIGS. 6-8 depict cage 242. Cage 242 has a semi-cylindrical body including a curved portion 202 having a predefined constant radius 'R,' and straight portions 204 extending downward from each end of curved portion 202. Each straight portion 204 has a defined length 'L.' The lengths of straight portions 204 are equal according to this embodiment. The lengths 'L' and radius 'R' can be varied to meet the space requirements for different systems 200. A flange 205 extends perpendicularly from the end of each straight portion 204. Each flange 205 extends outwardly in a direction away from longitudinal axis 'A' of system 200. Flanges 205 are provided for bolting to other components of system 200. Cage 242 may have a constant wall thickness 't.'

Upstream edge 206 of cage 242, which mates with cone 280 by welds or fasteners (for example), is three dimensional and extends in three different directions. More particularly, upstream edge 206 is curved as viewed in a Y-Z plane (see FIG. 6) of an X-Y-Z Cartesian coordinate system. Upstream edge 206 is convexly curved as viewed in an X-Z plane (see FIG. 8) such that the top center of the upstream edge 206 at point 'V' protrudes outwardly in an upstream direction beyond straight portions 204 and flanges 205. Upstream edge 206 is also curved as viewed in the X-Y plane (see FIG. 7) along radius 'R.' Radius R1 of upstream edge 206 in the X-Z plane is tailored to compliment the radius of edge 218 of cone 280.

Downstream edge 208 of cage 242 is curved in the X-Y plane (see FIG. 7) along radius 'R,' however, downstream edge 208 is not curved in the X-Z plane (see FIG. 8).

Figure 5:
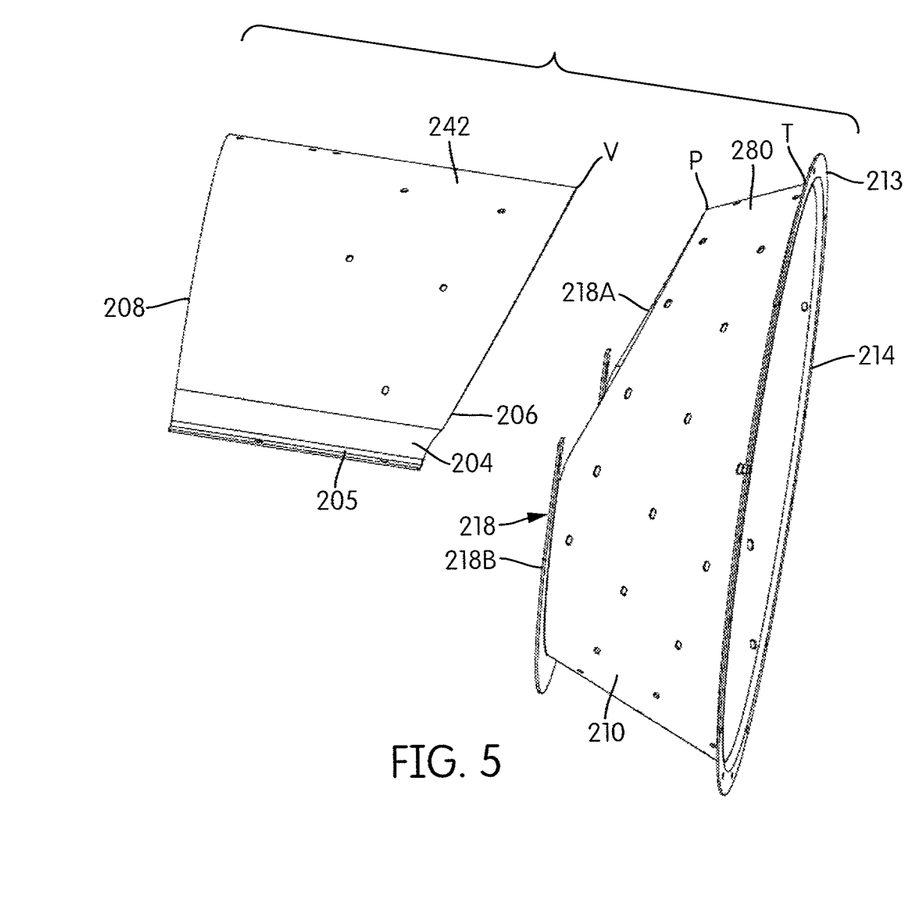
FIG. 5 is an exploded view showing the rotor cage and transition cone of the system of FIGS. 2-4.

As best shown in FIG. 5, transition cone 280 is connected to upstream edge 206 of cage 242. Cone 280 defines an infeed to the threshing zone between rotor 240 and cage 242. Transition cone 280 has a curved panel 210. A hood may be bolted to a flange 213 at the upstream end 214 of panel 210. Flange 213, which is provided at (or mounted to) an upstream edge 214 of panel 210, protrudes outwardly in a direction away from axis A, and is curved in the X-Y plane, but not the X-Z plane. Flange 213 could be replaced by an edge, if so desired.

Referring now to panel 210 of cone 280, panel 210 is either frusto-conical or semi-frusto-conical and comprises one or more sheets of material. In the axial direction, panel 210 extends between an upstream edge 214, which is adjacent the flange 213, and a downstream edge 218, which is mounted to the cage 242.

The downstream edge 218 of the cone 280 comprises a top edge 218A and bottom edge 218B. The top edge 218A of the cone 280 is curved to compliment and mate with upstream edge 206 of cage 242. Edge 218A appears concave as viewed from above. More particularly, edge 218A is also curved as viewed in the X-Y plane and has radius 'R' like cage 242. Downstream edge 218A is also curved as viewed in an X-Z plane and has radius 'R1' (like cage 242) such that the top center 'P' of the downstream edge 218A protrudes inwardly in an upstream direction with respect to the bottom edge 218B. Edge 218B, like flange 213, comprises a flange and is curved in the X-Y plane, but not the X-Z plane.

The top end of panel 210 slopes downward in the downstream direction from the top center upstream end point 'T' of panel 210 to the top center downstream end point 'P.' Stated differently, the radial distance between the axis A and the top center upstream end point 'T' of panel 210 is greater than the radial distance between the axis A and the top center downstream end point 'P.' The top end of panel 210, which decreases in diameter in the downstream direction, acts as a funnel in the downstream direction to channel the crop mat to the threshing zone between rotor 240 and cage 242.

The top center of panel 210 slopes downwardly in the downstream direction (i.e., toward axis A) to only a limited extent so as to create a funnel so that the crop mat passes from the hood (not shown) to the threshing zone, without sacrificing (i.e., without minimizing) the vertical clearance between rotor 240 and rotor cage 242 that constitutes the threshing zone. If the top center downstream end point 'P' at the interface between cone 280 and cage 242 were positioned any lower (i.e., closer to axis A), then sufficient vertical clearance between rotor 240 and cage 242 might not exist. It was discovered that curving the edge 218A of cone 208 in the X-Y plane as well as the X-Z plane achieves both goals of (i) funneling the crop mat to the threshing zone, and (ii) maximizing the size of the threshing zone.

Cone 280 and cage 242 may be composed of steel sheet metal material, for example, or any other material known to those skilled in the art.

By virtue of the geometry of cone 280 and cage 242 it is possible to both funnel crop material to the threshing zone and maintain a large radial clearance between rotor 240 and cage 242. The raised rotor cage provides more relief to the crop mat between the rotor and the rotor cage, which allows the crop mat to expand and grain to migrate to the outside of the crop mat for improved separation.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A threshing system of an agricultural harvester comprising:
   a rotor cage surrounding a rotor,
   a threshing space defined between the rotor cage and the rotor, and
   a transition cone defining an infeed to said rotor cage and said threshing system, the transition cone mounted to said rotor cage at a location upstream of the rotor cage, as viewed in a direction of crop flow through the threshing system,
   wherein a mating interface between the rotor cage and the transition cone is curved in three different dimensions of a Cartesian coordinate system for maximizing the threshing space.

2. The threshing system of claim 1, wherein the mating interface comprises a downstream edge of the transition cone that is mated to an upstream edge of the rotor cage.

3. The threshing system of claim 2, wherein the downstream edge of the transition cone is curved in three dimensions, and the upstream edge of the rotor cage is curved in three dimensions.

4. The threshing system of claim 2, wherein the downstream edge is abutted with the upstream edge of the rotor cage to form the mating interface.

5. The threshing system of claim 2, wherein the rotor cage includes a lower mounting surface for mounting to the threshing system, and the upstream edge of the rotor cage protrudes in an upstream direction beyond the lower mounting surface.

6. The threshing system of claim 1, wherein the mating interface extends along three different axes.

7. The threshing system of claim 1, further comprising a concave positioned at an elevation beneath the rotor cage.

8. The threshing system of claim 1, wherein the transition cone includes an upstream portion having an increasing radius in a downstream direction, and a downstream portion having a decreasing radius in the downstream direction.

9. The threshing system of claim 8, wherein the downstream portion of the transition cone is at least partially conical and a top center surface of the downstream portion of the transition cone slopes downwardly in the downstream direction.

10. The threshing system of claim 8, wherein a bottom portion of the transition cone extends in a downstream direction beyond a top center downstream point on the downstream portion of the transition cone.

11. The threshing system of claim 1, wherein the rotor comprises a downstream portion having threshing elements, and an upstream portion having an inlet auger including an auger flight.

12. The threshing system of claim 11, wherein the auger flight is surrounded by the transition cone.

13. The threshing system of claim 11, wherein the threshing elements are surrounded by the rotor cage.

14. The threshing system of claim 1, wherein the cage is at least partially cylindrical and the transition cone is at least partially conical.

15. The threshing system of claim 14, wherein the cage includes a cylindrical portion and straight leg portions extending downward from each end of the cylindrical portion.

16. The threshing system of claim 1, wherein the mating interface is curved in an X-Y plane, a Y-Z plane and an X-Z plane of the Cartesian coordinate system.

17. A threshing system of an agricultural harvester comprising:
   a rotor cage surrounding a rotor,
   a transition cone defining an infeed to said rotor cage and said threshing system, the transition cone mounted to said rotor cage at a location upstream of the rotor cage, as viewed in a direction of crop flow through the threshing system, and
   wherein, as viewed from above the threshing system, a convex portion of the rotor cage is mounted to a concave portion of the transition cone,
   wherein a mating interface between the rotor cage and the transition cone comprises a downstream edge of the transition cone that is mated to an upstream edge of the rotor cage, and
   wherein the downstream edge of the transition cone is curved in three dimensions, and the upstream edge of the rotor cage is curved in three dimensions.

18. The threshing system of claim 17, wherein the rotor comprises a downstream portion having threshing elements, and an upstream portion having an inlet auger including an auger flight, wherein the auger flight is surrounded by the transition cone, and the threshing elements are surrounded by the rotor cage.

* * * * *